United States Patent
Farnan

(10) Patent No.: US 10,684,424 B1
(45) Date of Patent: Jun. 16, 2020

(54) EXPANDED BEAM LC FIBER OPTIC CONNECTOR

(71) Applicant: Winchester Interconnect Corporation, Norwalk, CT (US)

(72) Inventor: Jerome Farnan, Franklin, MA (US)

(73) Assignee: WINCHESTER INTERCONNECT CORPORATION, Norwalk, CT (US)

( * ) Notice: Subject to any disclaimer, the term of this patent is extended or adjusted under 35 U.S.C. 154(b) by 0 days.

(21) Appl. No.: 16/213,456

(22) Filed: Dec. 7, 2018

(51) Int. Cl.
*G02B 6/38* (2006.01)

(52) U.S. Cl.
CPC ......... *G02B 6/3874* (2013.01); *G02B 6/3825* (2013.01); *G02B 6/3853* (2013.01)

(58) Field of Classification Search
CPC ... G02B 6/3874; G02B 6/3853; G02B 6/3825
See application file for complete search history.

(56) References Cited

U.S. PATENT DOCUMENTS

| | | | | |
|---|---|---|---|---|
| 6,511,231 B2 * | 1/2003 | Lampert | ............... | G02B 6/3825 385/70 |
| 6,738,557 B2 * | 5/2004 | Chang | .................... | G02B 6/266 385/140 |
| 8,244,084 B2 | 8/2012 | Durrant et al. | | |
| 8,406,583 B2 | 3/2013 | Farnan | | |
| 9,031,364 B1 | 5/2015 | Farnan | | |
| 9,195,008 B2 | 11/2015 | Farnan | | |
| 9,696,502 B2 | 7/2017 | Farnan | | |
| 2013/0044978 A1 * | 2/2013 | DeDobbelaere | ..... | G02B 6/3851 385/33 |

OTHER PUBLICATIONS

Information Disclosure Statement dated Sep. 16, 2019, 5 pages.

* cited by examiner

*Primary Examiner* — Ryan A Lepisto
(74) *Attorney, Agent, or Firm* — Rothwell, Figg, Ernst & Manbeck, P.C.

(57) ABSTRACT

An expanded beam optical connector includes a body, a tube holder, an alignment tube, and a collimator assembly. The tube holder is disposed within a bore of the body. The collimator assembly is received within the bore of the body and includes an optical fiber and a collimating lens having a collimated beam. A first end of the alignment tube is received within a first cavity of the tube holder, and the collimating lens is received within a second cavity of the tube holder such that the collimating lens is separated from the first end of the alignment tube by a gap and a centerline axis of the alignment tube is substantially aligned with an optical axis of the collimated beam.

13 Claims, 15 Drawing Sheets

US 10,684,424 B1

EXPANDED BEAM LC FIBER OPTIC CONNECTOR

FIELD OF THE DISCLOSURE

This disclosure relates to expanded beam connectors for a fiber optic cable.

BACKGROUND

Connectors that are used to align two optical fibers are commonly referred to as optical connectors. The vast majority optical connectors are of the "physical contact (PC)" type, and are referred to as PC optical connectors. In a PC optical connector that is used to connect two fibers, the two fibers are physically touching under pressure. For single mode fibers, the glass optical core of the fiber has to be aligned extremely accurately to ensure a low loss connection. This small core means that a scratch or dust on a fiber will cause the light to be greatly attenuated and potentially for the communication link to be lost Another type of optical connectors is the "expanded beam" (EB) optical connector. An EB optical connector reduces the effect of dust contamination or scratches by using a lens or a pair of lenses to focus the light between the two optical fibers. Typically, EB optical connectors use alignment inserts to align the optical paths between opposing lenses of counterpart EB optical connectors. These alignment inserts are typically machined from metal blocks containing a number of cylindrical holes. Each lens is placed in one end of a corresponding hole, and the fiber and ferrule combination are placed into the other end of the corresponding hole. The alignment method combines face alignment with an alignment pin. These designs are common, and for example, MIL-PRF-83526 describes this connector style. This type of EB connector is also described in the following patents and published applications: U.S. Pat. No. 8,824,841, U.S. Patent Pub. No. 2007/0211999, U.S. Pat. Nos. 7,722,261, and 8,556,521. This type of EP optical connector may be known as an alignment insert exposed lens EB connector.

Another type of EB connector uses a single lens and a ferrule with the lens on one end of a tube and the fiber entering the other end. This type of EB connector also uses an alignment sleeve (commonly called split sleeve), in which the fiber, the lens, the ferrule, and the alignment tube are generally concentric. The light beam may or may not be concentric. Examples of these EB connectors are described in U.S. Pat. Nos. 8,244,084, 7,775,725, 8,827,567. This type of EB optical connector may be known as an alignment sleeve exposed lens EB connector.

SUMMARY

EB optical connectors using alignment inserts are characterized by small beam sizes, short working distances, and complex construction, often resulting in misalignment between the optical axis of the lens on the first connector and the second mating connector. This is due to the mechanical alignment face of the insert or alignment pin becoming damaged, incorrect assembly methods, or mechanical shock or vibration. EB optical connectors using alignment sleeves with exposed lenses have lenses located adjacent to the tip of the alignment sleeve, and consequently, may become damaged from unintended contact. The lens can never be larger than the alignment tube and so beam size is limited. There is no control over the optical axis of the light beam so the optical quality relies on mechanical tolerances of all components being controlled very tightly, at the limits of current state of the art. Also if an angle is introduced into the beam path, the beam will be offset from the mechanical axis, causing difficulty in alignment EB Optical Connectors Accordingly, there is a need for an improved EB optical connector that reliably maintains proper alignment between the alignment tube and a collimating lens of a collimating assembly. Moreover, there is a need for an improved EB optical connector that increases the separation distance between the collimating lens and the end of the alignment tube while still allowing light to be properly transmitted along the centerline axis of the alignment tubes and to the corresponding collimating lens in the mating connector.

The present disclosure describes various examples of an EB optical connector for coupling to an optical cable. In accordance with one embodiment, the EB optical connector may comprise: a body comprising a first end, a second end, and a bore extending from the first end to the second end; a tube holder received within the bore of the body, the tube holder comprising a first end, a second end, a first cavity opening from the first end of the tube holder, a second cavity opening from the second end of the tube holder, and an annular-shaped partition separating the first cavity from the second cavity and surrounding a passage opening into the first and second cavities; an alignment tube received within the bore of the body, the alignment tube comprising a first end and a second end and defining a centerline axis that extends from the first end to the second end; and a collimator assembly received within the bore of the body, the collimator assembly comprising an optical fiber and a collimating lens defining a substantially collimated optical beam. In various embodiments, the first end of the alignment tube is received within the first cavity of the tube holder, and the collimating lens is received within the second cavity of the tube holder such that the collimating lens is separated from the first end of the alignment tube by a gap and the centerline axis of the alignment tube is substantially aligned with an optical axis of the collimated optical beam exiting the collimating lens.

The present disclosure describes various examples of an optical connector adaptor for coupling to an optical cable. In accordance with one embodiment, the optical connector adaptor may comprise: a housing; two or more ports including a first port opening from a first end of the housing and a second port opening from a second end of the housing and opposing the first port; and an alignment sleeve comprising a first open end and a second open end, the alignment sleeve is disposed between the first and second ports such that the first open end of the alignment sleeve is disposed in the first port and the second open end of the alignment sleeve is disposed in the second port. In various embodiments, each port is configured to receive an EB optical connector of such that the EB optical connector is removably coupled to the housing when received in a respective port. In various embodiments, the first open end of the alignment sleeve is configured to receive the second send of the alignment tube of a first EB optical connector when received in the first port, and the second open end of the alignment sleeve is configured to receive the second end of the alignment tube of a second EB optical connector when received in the second port such that alignment sleeve substantially aligns the centerline axes of the alignment tubes of the first and second EB optical connectors when received in the first and second ports.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

Figure 1:
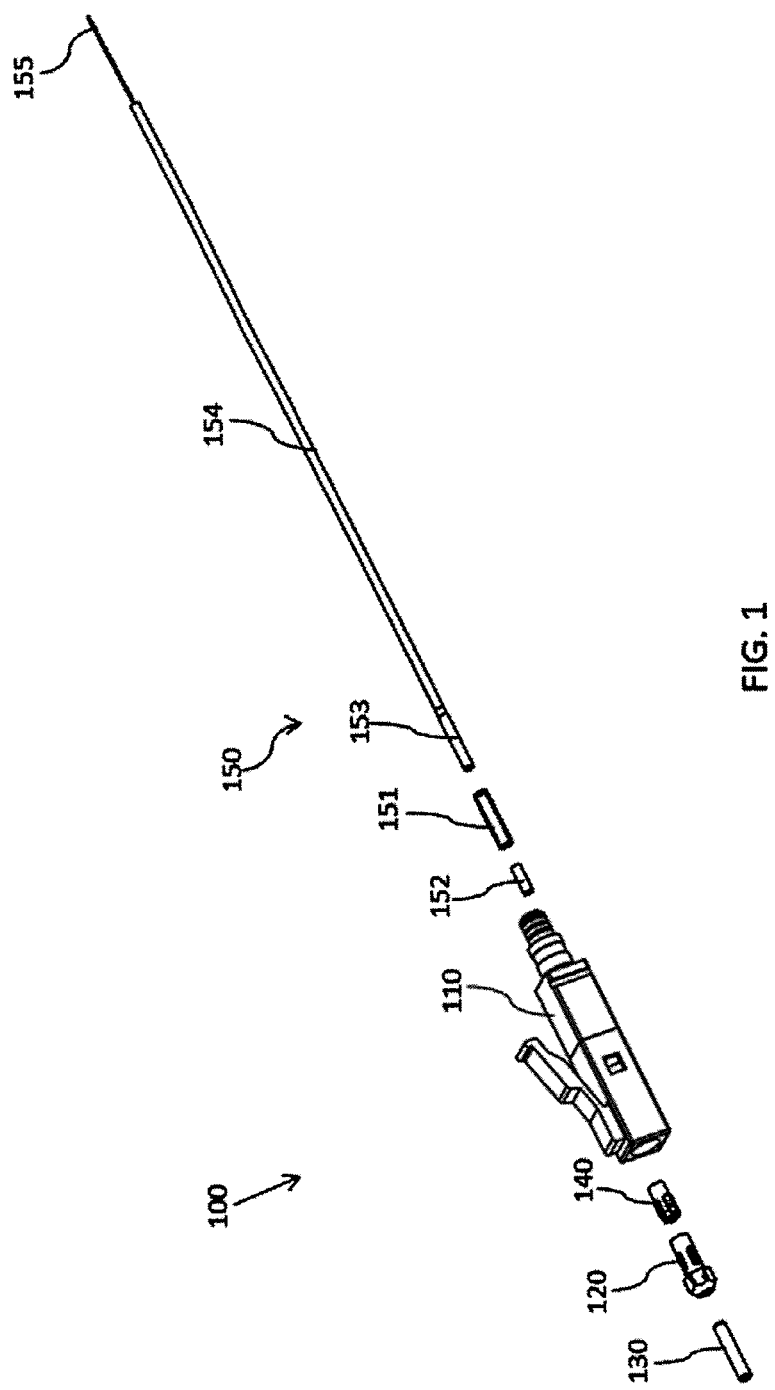
FIG. 1 is an exploded view of an EB LC connector according to one example.

FIG. 1 shows an exploded view of an expanded beam (EB) lucent connector (LC) 100 according to an embodiment. The EB LC connector 100 comprises a body 110, a tube holder 120, an alignment tube 130, an epoxy sleeve 140, and a collimator assembly 150 for a fiber optic cable. The collimator assembly 150 comprises a lens holder 151, a collimating lens 152, a ferrule 153, a cable jacket 154, and an optical fiber 155 that is in optical communication with the collimating lens 152. In various embodiments, the tube holder 120 is housed in the body 110 and coupled to the alignment tube 130 and the optical assembly 150 to align an optical axis of the collimating lens 152 with a centerline (e.g. central longitudinal) axis of the alignment tube 130, such that the connector 100 may securely maintain optical communication between the alignment tube 130 and the optical collimator assembly 150.

Figure 2:
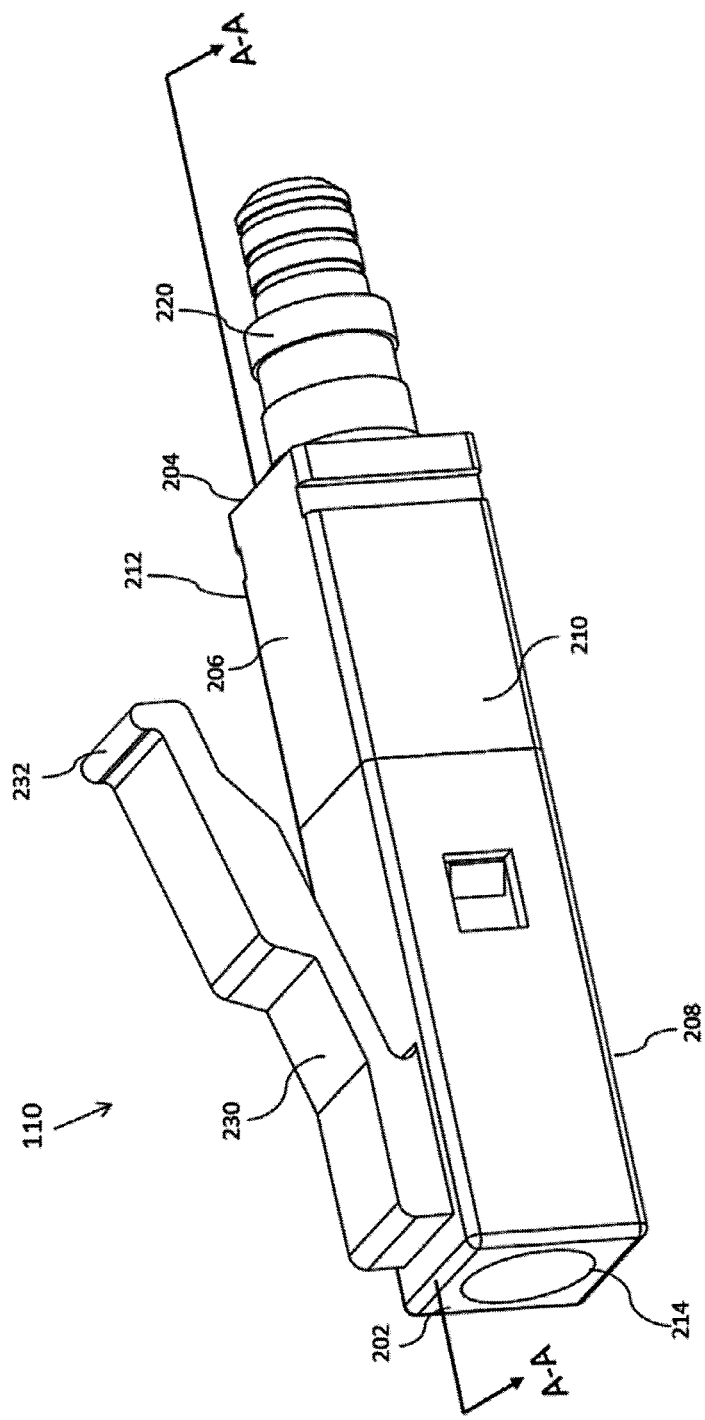
FIG. 2 is a perspective view of a body according to one example.

As shown in FIG. 2, the body 110 comprises a first end 202, a second end 204, a top wall 206, a bottom wall 208, and a pair opposed side walls 210, 212, in which the top wall 206, the bottom wall 208, and the side walls 210, 212 extend from the first end 202 to the second end 204. The body 110 comprises a latch 230 projecting from the top wall 206 and comprising a distal end 232 that is biased in a direction away from the top wall 206. In some embodiments, the latch 230 is comprised of a resilient material.

Figure 3:
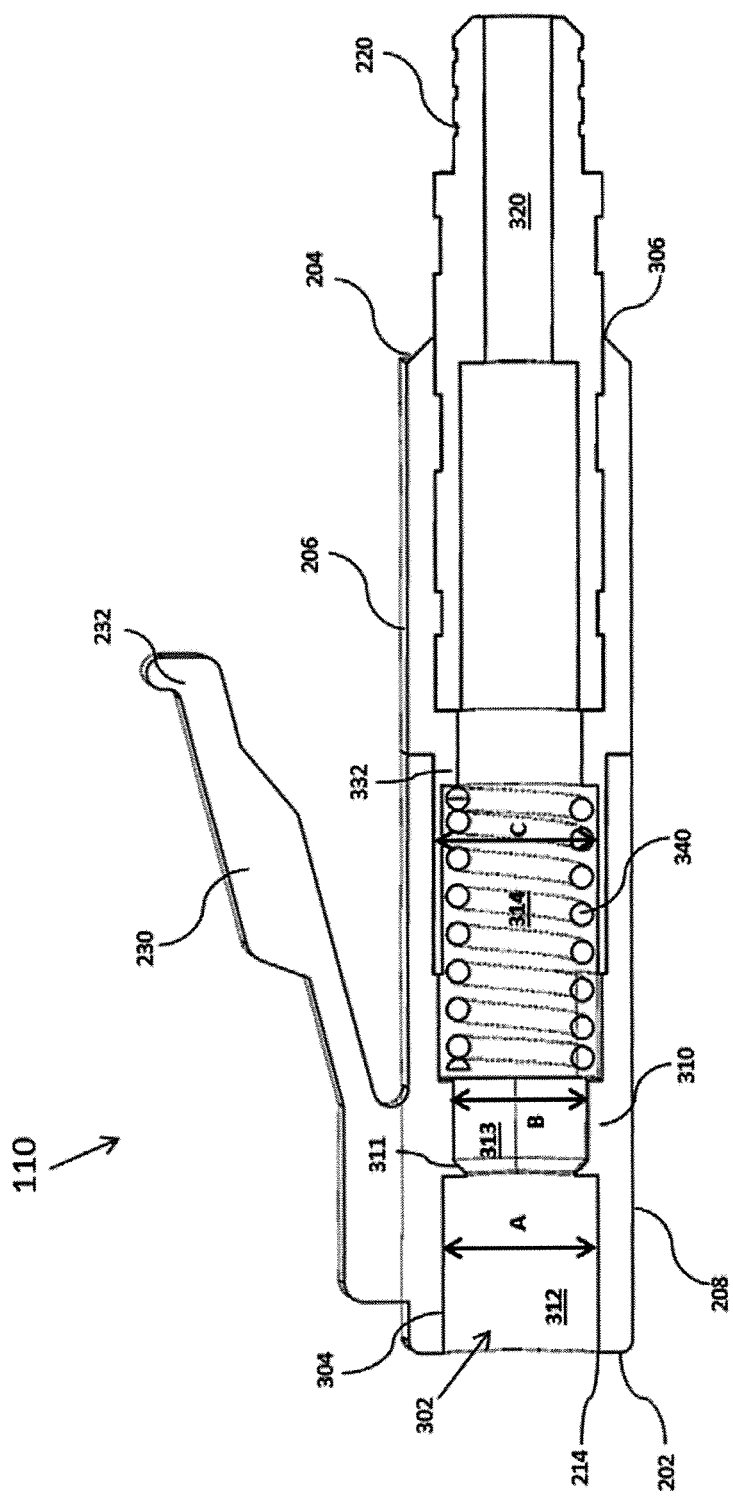
FIG. 3 is a side cross-sectional view of the body taken along line A-A in FIG. 2 according to one example.

Referring to FIGS. 2 and 3, the ends 202, 204 and the walls 206-212 of the body 110 define a bore 302 that extends along a central longitudinal axis of the body 110. A circular-shaped first opening 214 is disposed along the first end 202 and opens into the bore 302 of the body 110. The body 110 comprises an interior surface 304 that extends from the first opening 214 at the first end 202 toward a second opening 306 disposed at the second end 204. The body 110 houses a cable holder 220 disposed in the bore 302 of the body 110 and projecting through the second opening 306 of the body 110. As shown in FIG. 3, the cable holder 220 is secured against the interior surface 304 of the body 110 and defines a passage 320 that opens into the bore 302 of the body 110.

The body 110 comprises a neck 310 projecting away from the interior surface 304 and terminating before reaching the central longitudinal axis of the body 110 such that the neck 310 divides the bore 302 into a first region 312 extending from a front end of the neck 310 to the first end 202 of the body 110, a second region 313 extending from the front end of the neck 310 to a back end of the neck 310, and a third region 314 extending from the back end of the neck 310 to the second end 204 of the body 110. In the illustrated embodiment, each of the first, second, and third regions 312-314 include a transverse dimension A-C (e.g., diameter of the bore 302 at the corresponding location along the body 110), in which the transverse dimension B of the second region 313 is less than the transverse dimension A of the first region 312 and less than the transverse dimension C of the third region 314.

As shown in FIG. 3, the body 110 houses a spring 340 disposed in the third region 314 of the bore 302. The spring 340 is secured between the back end of the neck 310 and a shoulder 332 projecting from an interior surface 330 of the cable holder 220.

Figure 4:
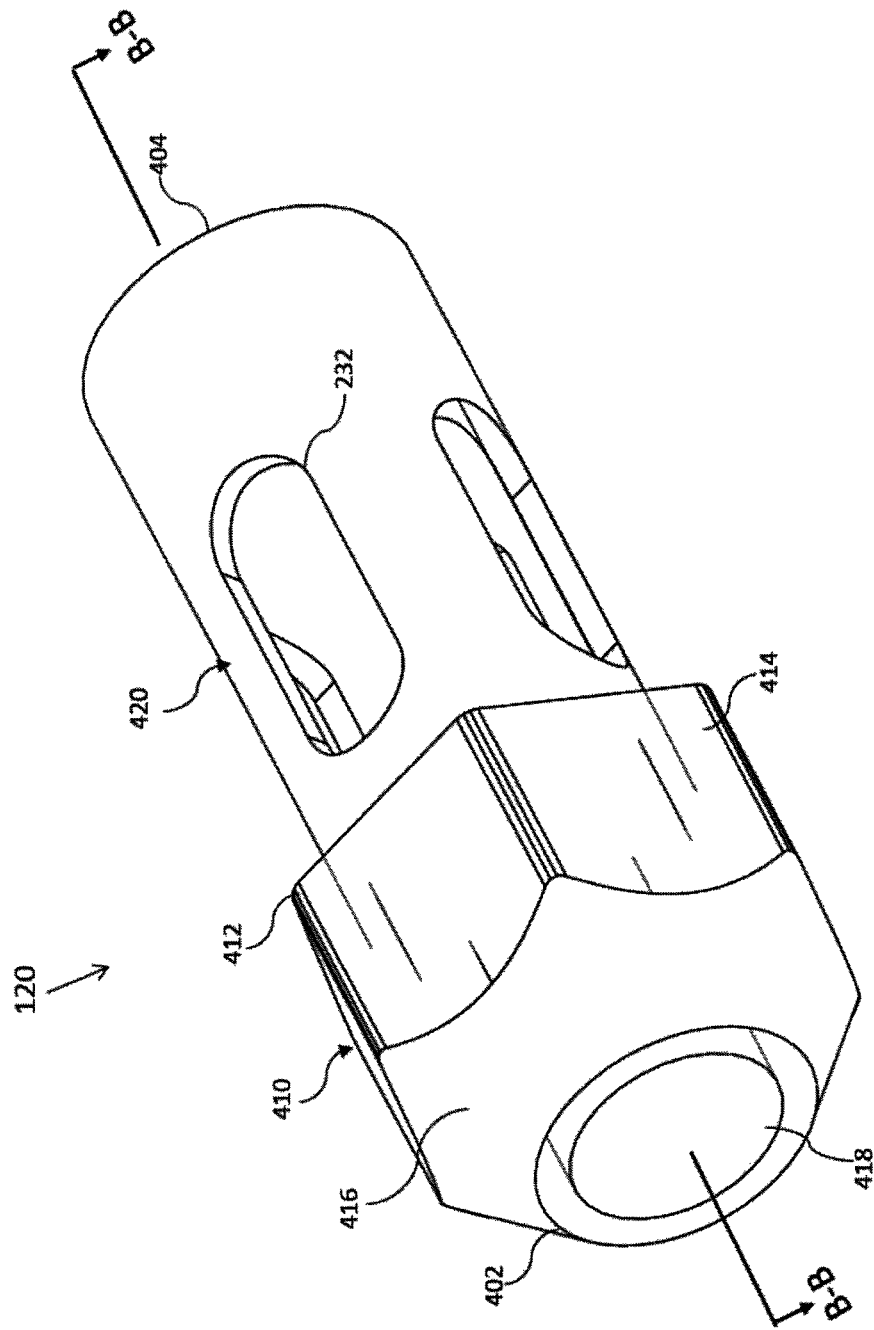
FIG. 4 is a perspective view of a tube holder according to one example.
Figure 5:
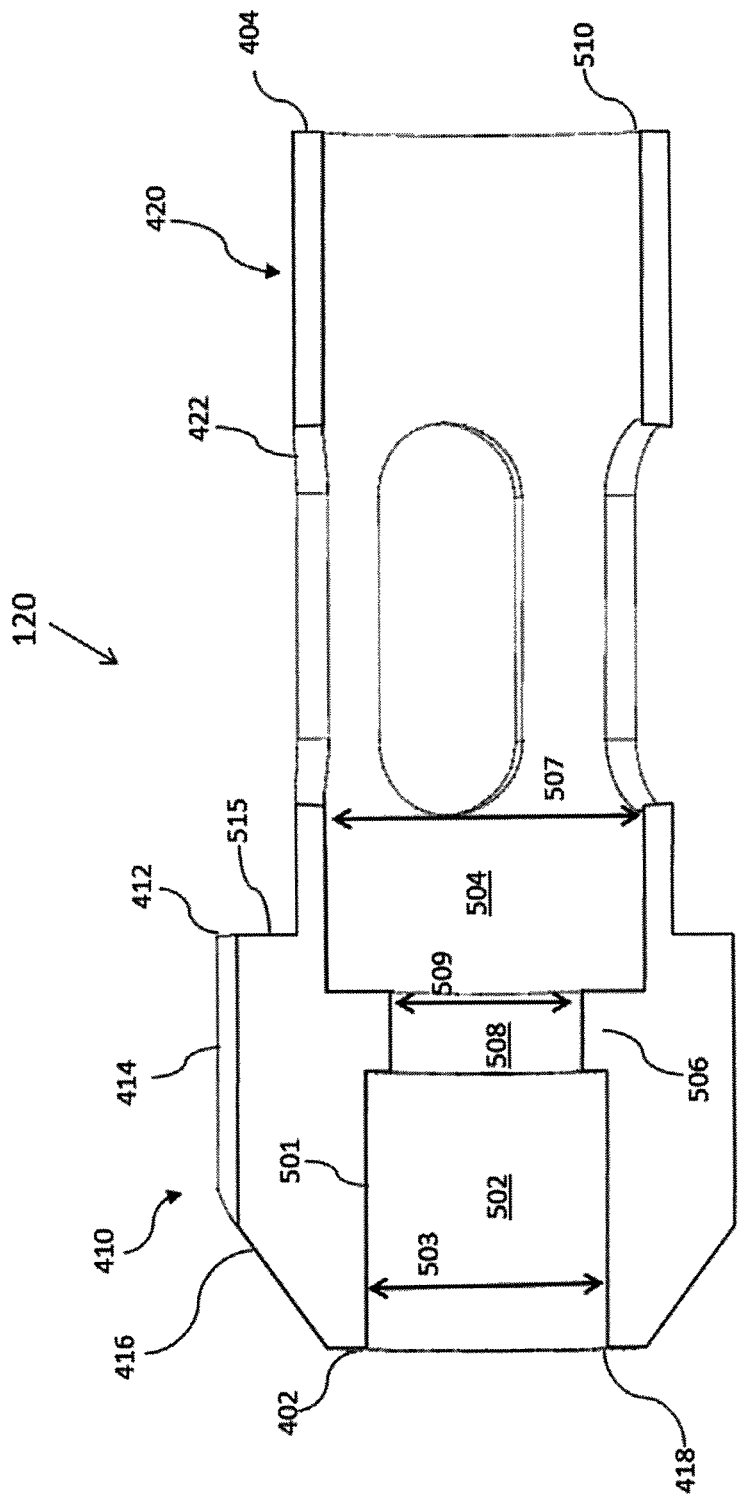
FIG. 5 is a side cross-sectional view of the tube holder taken along line B-B in FIG. 4 according to one example.

Referring to FIGS. 4 and 5, the tube holder 120 comprises a head 410 disposed proximate to a first end 402 of the tube holder 120 and a sleeve 420 extending away from the head 410 in a first direction and terminating along a second end 404 of the tube holder 120. In the example shown in FIGS. 4 and 5, the head 410 comprises a hexagonal-shaped flange 412 projecting radially from the sleeve 420, where the sleeve 420 extends from a back end 515 of the flange 412. The flange 412 comprises six faces 414 disposed along the side of the head 410. The head 410 further comprises a conical-shaped nose 416 projecting from a front of the flange 412 in a second direction, opposite to the first direction, and terminating along the first end 402 of the tube holder 120.

As shown in FIG. 5, the tube holder 120 comprises a first cavity 502 extending from the opening 418 at the first end 402 and into the head 410, a second cavity 504 opening from the second end 404 of the tube holder 120 and extending along the sleeve 420, and an annular-shaped partition 506 projecting from an interior surface 501 of the tube holder 120 and defining a passage 508 that opens into both the first cavity 502 and the second cavity 504. The opening 418 at the first end 402 In some embodiments, the first cavity 502 comprises a first transverse dimension 503 (e.g., diameter of the first cavity 502), and the second cavity 504 comprises a second transverse dimension 505 (e.g., diameter of the second cavity 504), in which the first transverse dimension 503 is less than the second transverse dimension 505. In some embodiments, the passage 508 comprises a third transverse dimension 509 (i.e. diameter of the passage 508) that is less than the first transverse dimension 503 and less than the second transverse dimension 505.

Referring to FIGS. 4 and 5, the tube holder 120 comprises an opening 418 disposed at the first end 402 that opens into the first cavity 502 and an opening 510 disposed at the second end 404 that opens into the second cavity 504. In various embodiments, the opening 418 and the first cavity 502 are shaped to receive the alignment tube 130. In various embodiments, the opening 510 and the second cavity 504 are shaped to receive the lens holder 151 holding the collimating lens 152 and the ferrule 153 of the collimator assembly 150. In various embodiments, the sleeve 420 comprises one or more slots 422 disposed along the peripheral edge of the sleeve 420 that open into the second cavity 504.

Figure 6:
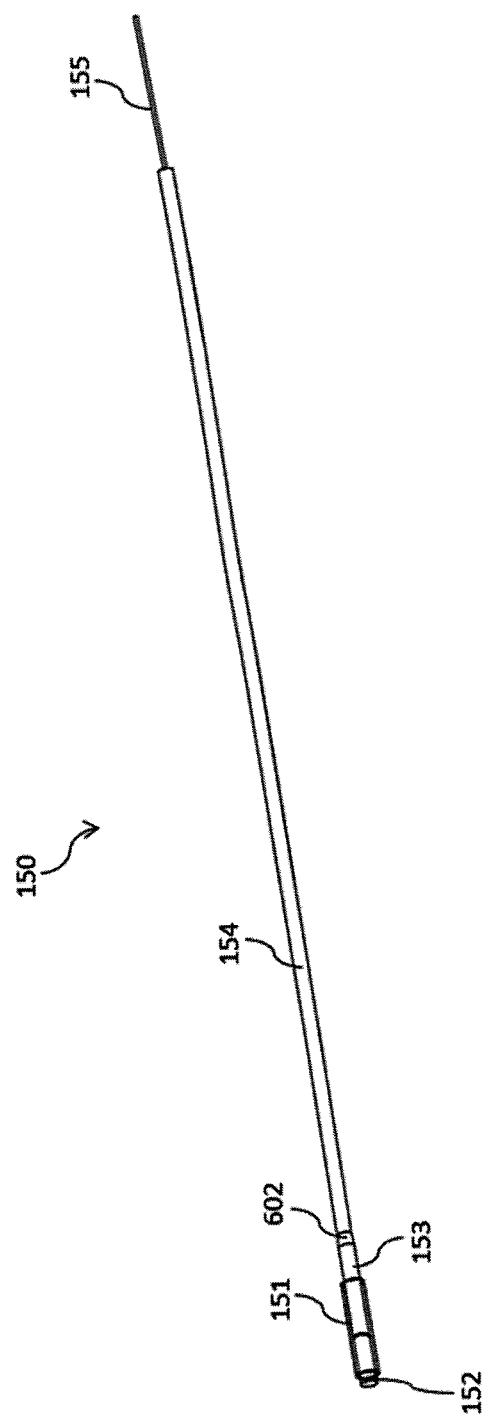
FIG. 6 is a perspective view of an optical cable according to one example.

In various embodiments, the collimator assembly 150 secures a terminating end 702 of the optical fiber 155 proximate to the collimating lens 152 such that light waves transmitted along the optical fiber 155 may be emitted by the lens 152 and incoming light waves received by the lens 152 may be transmitted to the optical fiber 155. In the embodiment shown in FIGS. 6 and 7, the optical fiber 155 extends through the cable jacket 154, where the cable jacket 154 is pressed against a proximal end 602 of the ferrule 153. The optical fiber 155 protrudes through an opening of the cable jacket 154, and the terminating end 702 of the optical fiber 155 is received in the ferrule 153.

Figure 7:
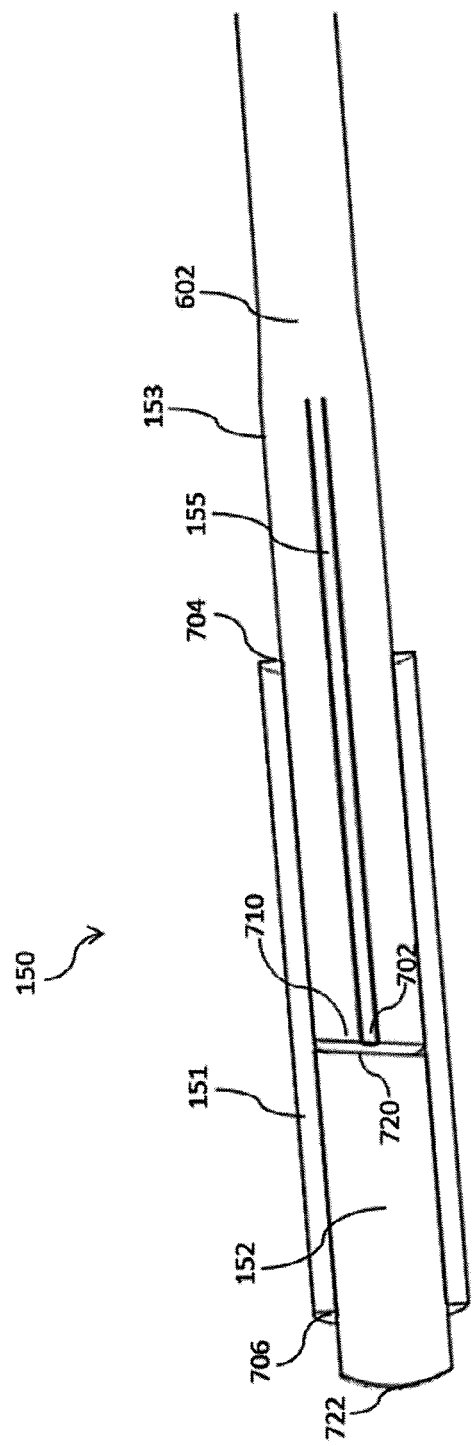
FIG. 7 is a cross-sectional view of collimator assembly according one example.

In the embodiment shown, the lens holder 151 is a tube (e.g., a glass tube) open at both a first end 704 and a second end 706 thereof. Referring to FIG. 7, a distal end 710 of the ferrule 153 is inserted through the first end 704 of the lens holder 151 and a first end 720 of the collimating lens 152 is inserted through the second end 706 of the lens holder 151, such that the distal end 710 of the ferrule 153 and the terminating end 702 of the optical fiber 155 are disposed proximate to the first end 720 of the collimating lens 152. A second end 722 of the collimating lens 152 is disposed outside the lens holder 151, where the collimating lens 152 protrudes out of the second end 706 of the lens holder 151.

In various embodiments, the lens holder 151 comprises an internal diameter that corresponds to the diameter of the ferrule 153 and the diameter of the collimating lens 152, such that the ferrule 153 and the collimating lens 152 are securely engaged against the interior surface 708 of the lens holder 151.

In the illustrative embodiment, the collimating lens 152 is generally cylindrical in shape and having a diameter (or width) in the range of 0.5 to 5 mm. In some embodiments, the collimating lens 152 is a gradient-index (GRIN) lens (e.g., a GRIN cylindrical lens). In other embodiments, collimating lens may be a ball lens (e.g., a 3 mm ball lens).

Figure 8:
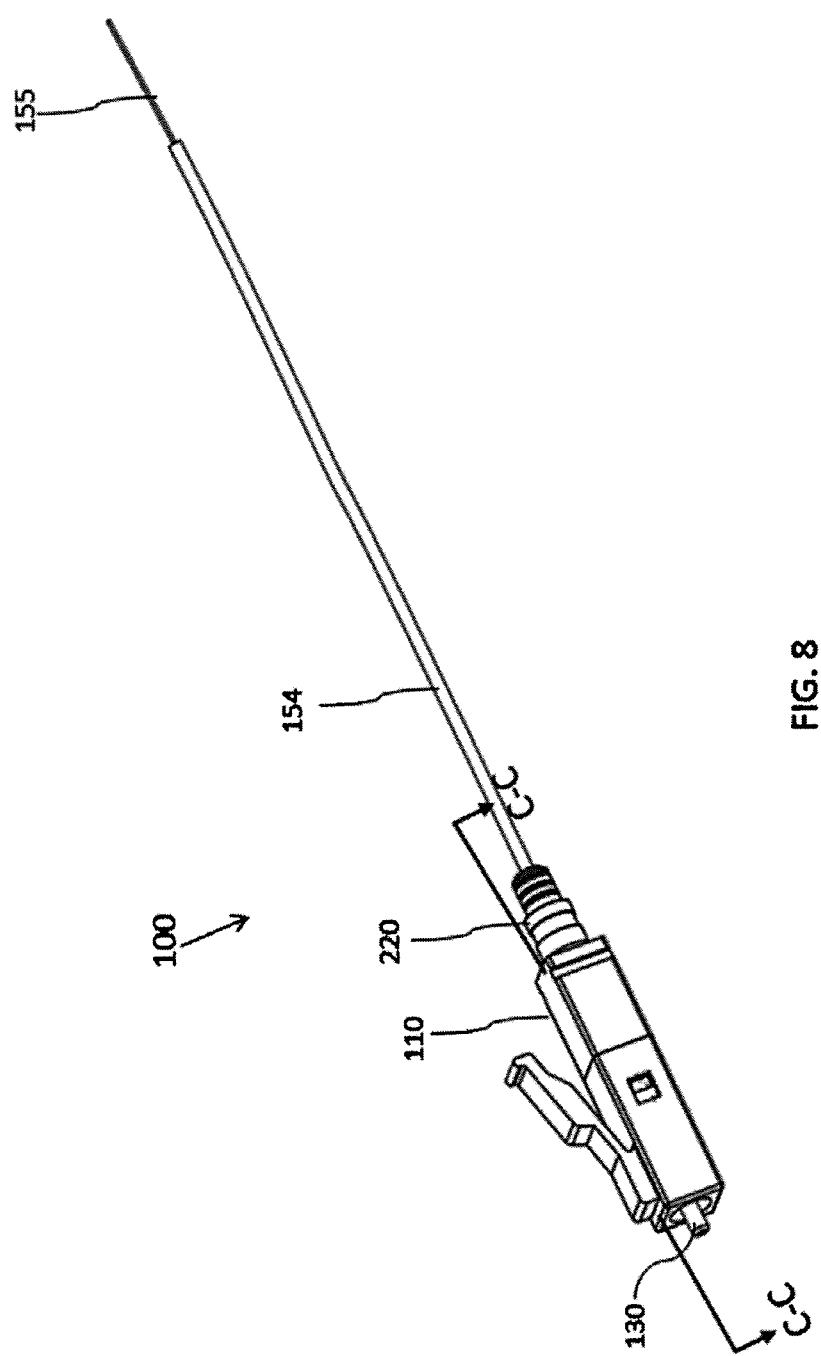
FIG. 8 is a perspective view of the EB LC connector according to one example.
Figure 9:
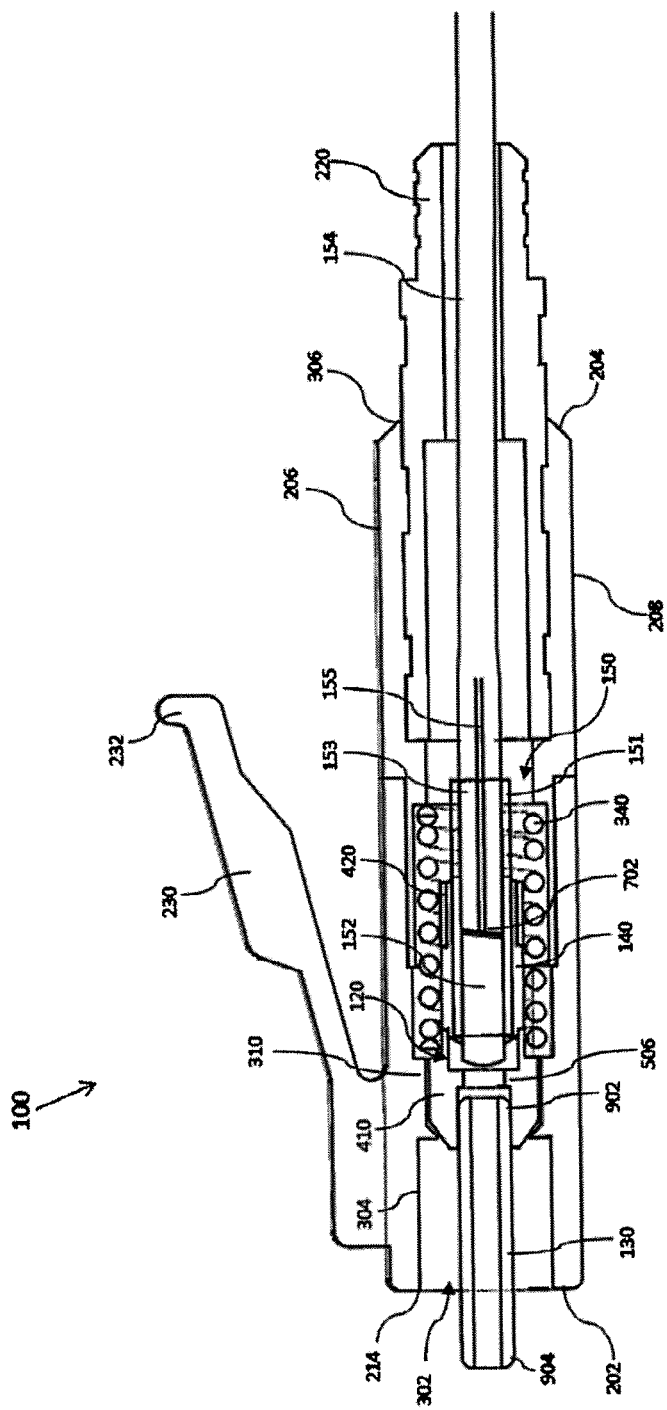
FIG. 9 is a cross-sectional view of the EB LC connector taken along line C-C in FIG. 8 according to one example.
Figure 10:
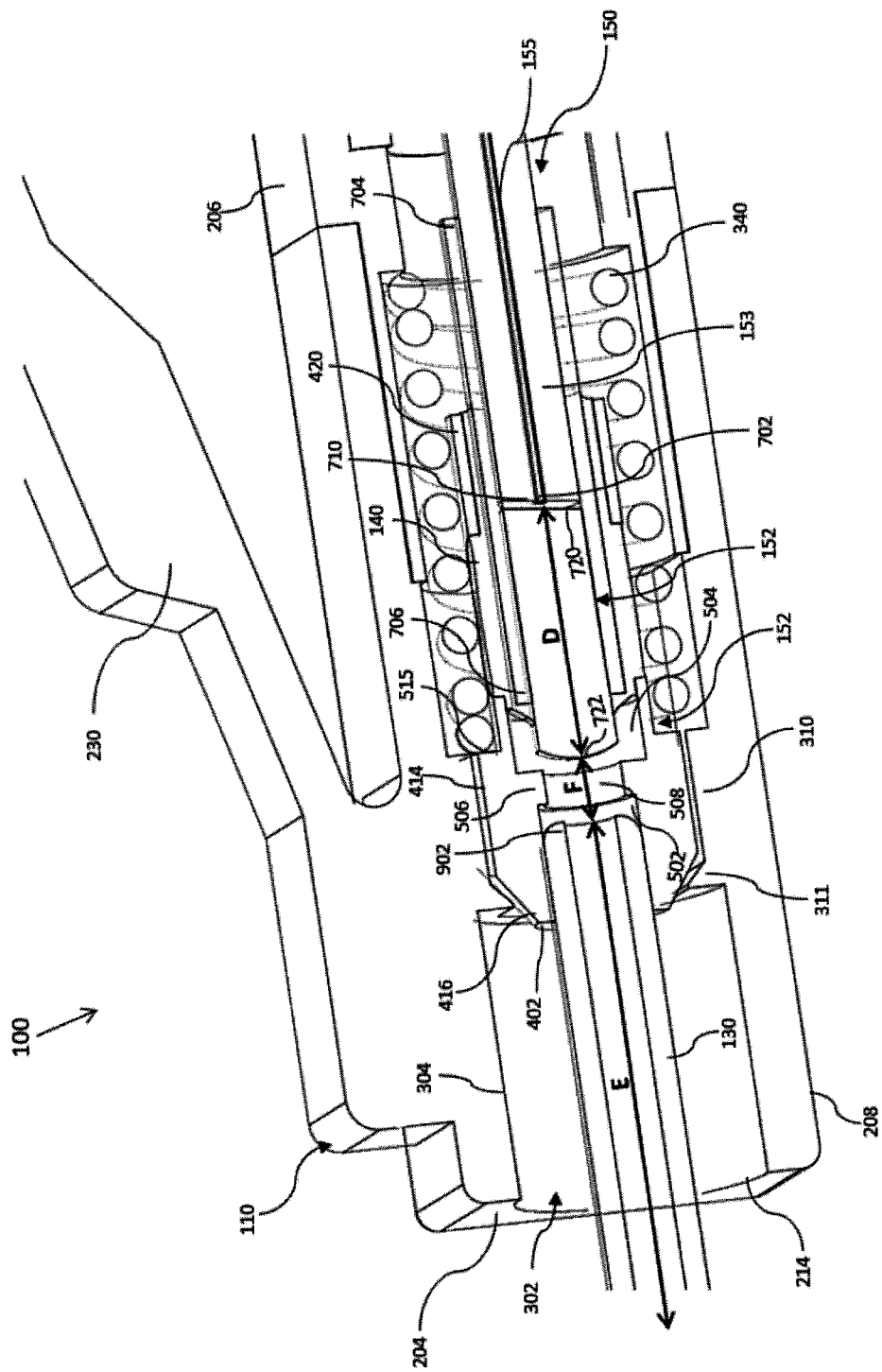
FIG. 10 is a detailed cross-sectional view of the EB LC connector.

FIGS. 8-10 show various views of a non-limiting embodiment of the EB connector 100 configured to introduce light waves transmitted from the collimating assembly 150 through the alignment tube 130 to other optical cable connectors or receive light waves through the alignment tube 130 to the collimating assembly 150. As shown in FIG. 10, the EB connector 100 establishes optical communication between the collimating assembly 150 and the alignment tube 130 by maintaining alignment between the optical axis D of the collimating lens 152 and the centerline axis E of the alignment tube 130.

Referring to FIGS. 9 and 10, the tube holder 120 is received in the bore 302 of the body 110, where the head 410 is disposed in the second region 313 defined along the neck 310. The faces 414 of the collar 412 are engaged against an interior surface of the neck 310. The spring 340 is received around the sleeve 420 of the tube holder 120 and secured against the back end 413 of the head 410 and the shoulder 332 of the cable holder 220, thereby biasing the tube holder 120 toward the first end 202 of the body 110. The neck 310 includes a shoulder 311 protruding toward the central longitudinal axis of the body 110. As the spring 340 biases the tube holder 120 toward the first end 202 of the body 110, the shoulder 311 of the neck 310 engages the nose 416 of the head 410, thereby limiting movement of tube holder 120 along the central longitudinal axis of the body 110.

The alignment tube 130 is inserted through the first opening 214 at the first end 202 of the body 110, where a first end 902 of the alignment tube 130 is received in the first cavity 502 defined by the head 410 of the tube holder 120 and the second end 904 of the alignment tube 130 is disposed outside of the body 110. The first transverse dimension 503 of the first cavity 502 corresponds to the outer diameter of the alignment tube 130 so that the exterior surface of the alignment tube 130 engages the interior surface 501 of the tube holder 120. In some embodiments, the outside diameter of the alignment tube 130 ranges from about 1.25 mm to about 2.5 mm. In some embodiments, the inside diameter of the alignment tube 130 ranges from about 0.2 mm to about 2 mm. In some embodiments, a length of the alignment tube 130 ranges from about 5 mm to about 10 mm. Once the first end 902 of the alignment tube 130 is secured in the first cavity 502 of the tube holder 120, the centerline axis E of the alignment tube 130 is substantially aligned with the passage 508 defined along the partition 506 of the tube holder 120.

Referring to FIG. 9, the lens holder 151 holding the collimating lens 152 and the ferrule 153 is inserted through the cable holder 220 and received in the second cavity 504 defined by the sleeve 420 of the tube holder 120. The cable jacket 154 and the corresponding portion of the optical fiber 155 extend through the third region 314 of the bore 302 and the passage 320 of the cable holder 220.

In the illustrated embodiment, the lens holder 151 is secured to the tube holder 120 by injecting and curing an epoxy sleeve 140 disposed between an interior surface 501 of the tube holder 120 and an exterior surface of the lens holder 151. The epoxy sleeve 140 extends through the slots 422 of the sleeve 420 to promote adhesive contact with the sleeve 420 of the tube holder 120. In some embodiments, the slots 422 provide access for a nozzle to inject the epoxy material to be injected between the exterior surface of the lens holder 151 and the interior surface 501 of the tube holder 120 and permit the transmission of UV rays to cure the epoxy material. In other embodiments, the lens holder 151 may be securely attached to the tube holder 120 by other processes, such as laser welding or soldering.

After inserting the alignment tube 130 and the lens holder 151 into the tube holder 120, but before securely attaching the lens holder 151 to the tube holder 120, the lens holder 151 and the alignment tube 130 are positioned such that the optical axis D of the collimating lens 152 is substantially aligned with the centerline axis E of the alignment tube 130. In some embodiments, the alignment process includes adjusting the position of the lens holder 151 within the tube holder 120 until a light beam exiting collimating lens 152 in a direction toward the alignment tube 130 will pass through and exit the alignment tube 103 substantially unattenuated, that is, experiencing not more than a loss of about 2 dB.

As shown in FIG. 10, once the lens holder 151 is secured attached in the tube holder 120, the second end 722 of the collimating lens 152 is separated from the first end 902 of the alignment tube 130 by a gap F. In some embodiments, the gap F ranges from about 0.01 mm to about 5 mm. In some embodiments, the second end 722 of the collimating lens 152 is spatially separated from the partition 506 and does not protrude through the passage 508 defined along the partition 506. In some embodiments, the first end 902 of the alignment tube 130 is spatially separated from the partition 506 and does abut against the partition 506. Accordingly, in some embodiments, the gap F extending between the first end 902 of the alignment tube 130 and the second end 722 of the collimating lens 152 may be longer than the length of the passage 508 defined along the partition 506 of the tube holder 120.

Figure 11:
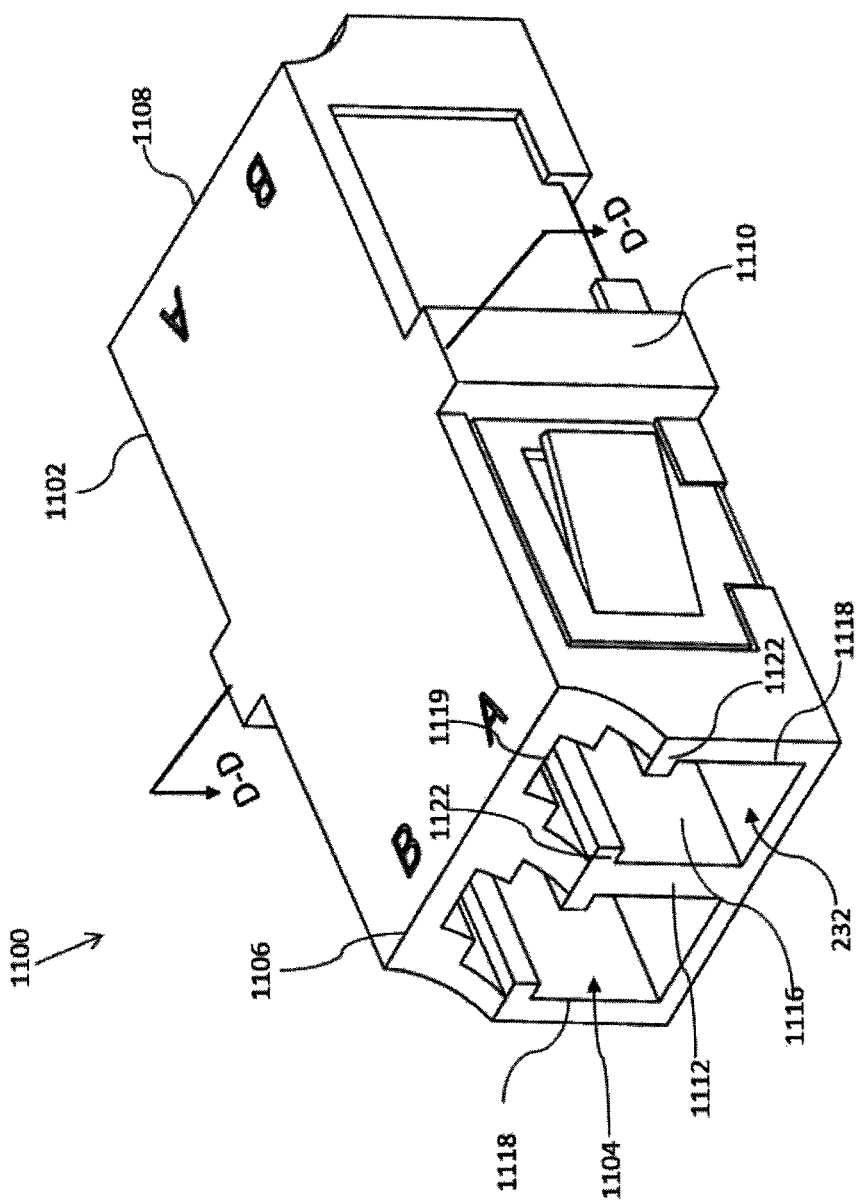
FIG. 11 is a perspective view of an optical connector adaptor according to one example.

FIGS. 11-15 illustrate various views of an optical connector adaptor 1100 configured to align and mate two or more EB LC connectors 100 such that light beams may be introduced from one of the EB LC connectors 100 and received from the other one of the EB LC connectors 100. As shown in FIG. 11, the optical connector adaptor 1100 comprises a housing 1102 that includes a first end 1106, a second end 1108, and two or more ports 1104. Each port 1104 opens from one of the ends 1106, 1108 of the housing 1102 and is configured to receive and mate with one of the EB LC connectors 100.

Figure 12:
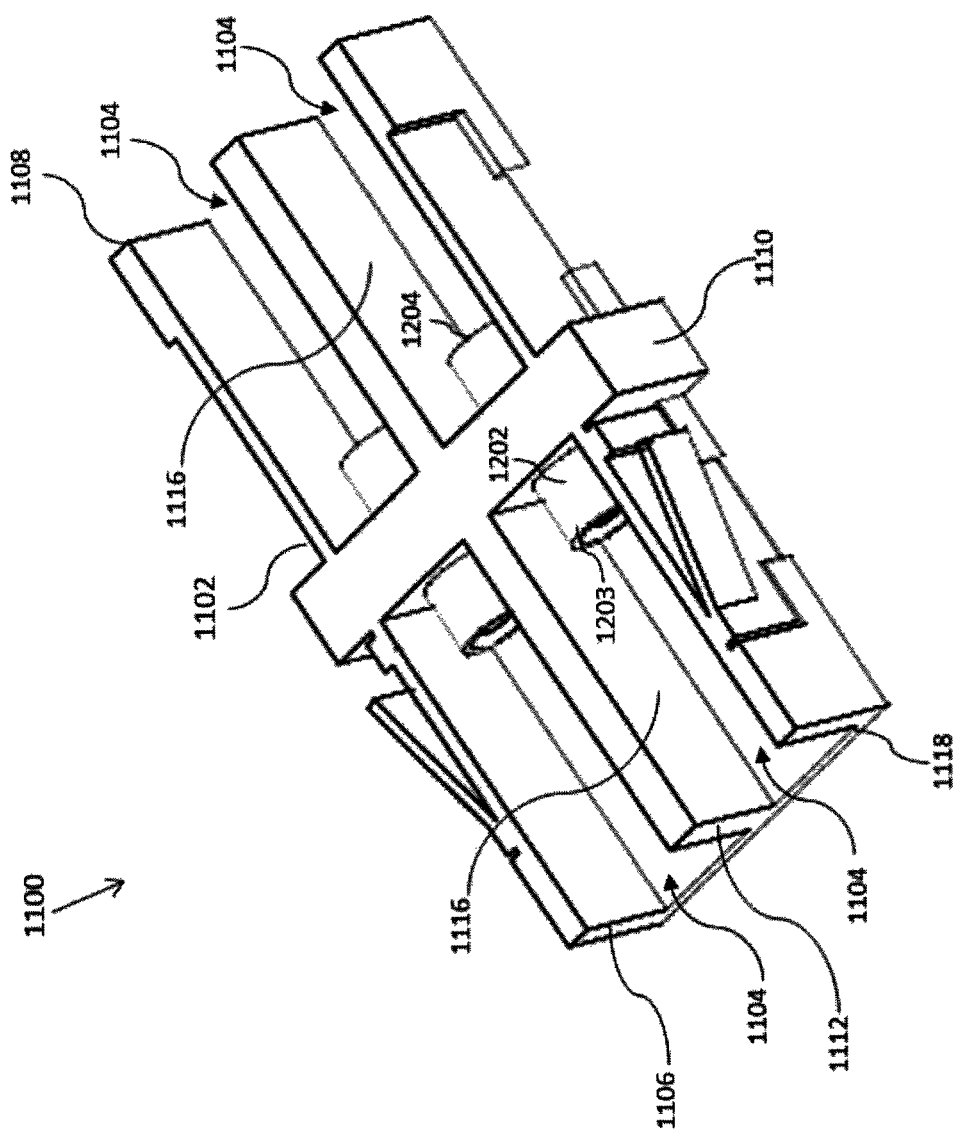
FIG. 12 is a cross-sectional view the optical connector adaptor taken along line D-D in FIG. 11 according to one example.

Referring to FIGS. 11 and 12, the housing 1102 comprises a first wall 1110 extending laterally along the center of the housing 1102 and a second wall 1112 extending longitudinally along the center of the housing 1102. The first wall 1110 intersects with the second wall 1112 to define four ports 1104 in the housing 1102, in which each port 1104 is opposed and aligned with a counterpart port 1104 disposed on an opposite side of the first wall 1110.

Each port 1104 includes a pair of opposing side walls 1116 that define an opening 1118 formed through an end 1120 of the housing 1102. A pair of opposing guide bars 1122 project from the pair of the side walls 1116 to align the body 110 of the connector 100 into the opening 1118 of a respective port 1104. Each port 1104 includes a tab 1119 formed along an upper edge of the opening 1118 that is configured to engage the latch 230 of the body 110 when a connector 100 is inserted into the port 1104 such that the connector 100 becomes removably coupled to the housing 1102.

As shown in FIG. 12, for each pair of opposed ports 1104, a sleeve holder 1202 extends through the first wall 1110, where a first end 1203 of the sleeve holder 1202 is disposed in one of the opposing ports 1104 and a second end 1204 of the sleeve holder 1302 is disposed in the other one of the opposing ports 1104. In the illustrated embodiment, the sleeve holder 1202 is tubular shaped and configured to be disposed in the first opening 214 of the body 110 when the connector 100 is inserted into the port 1104.

Figure 13:
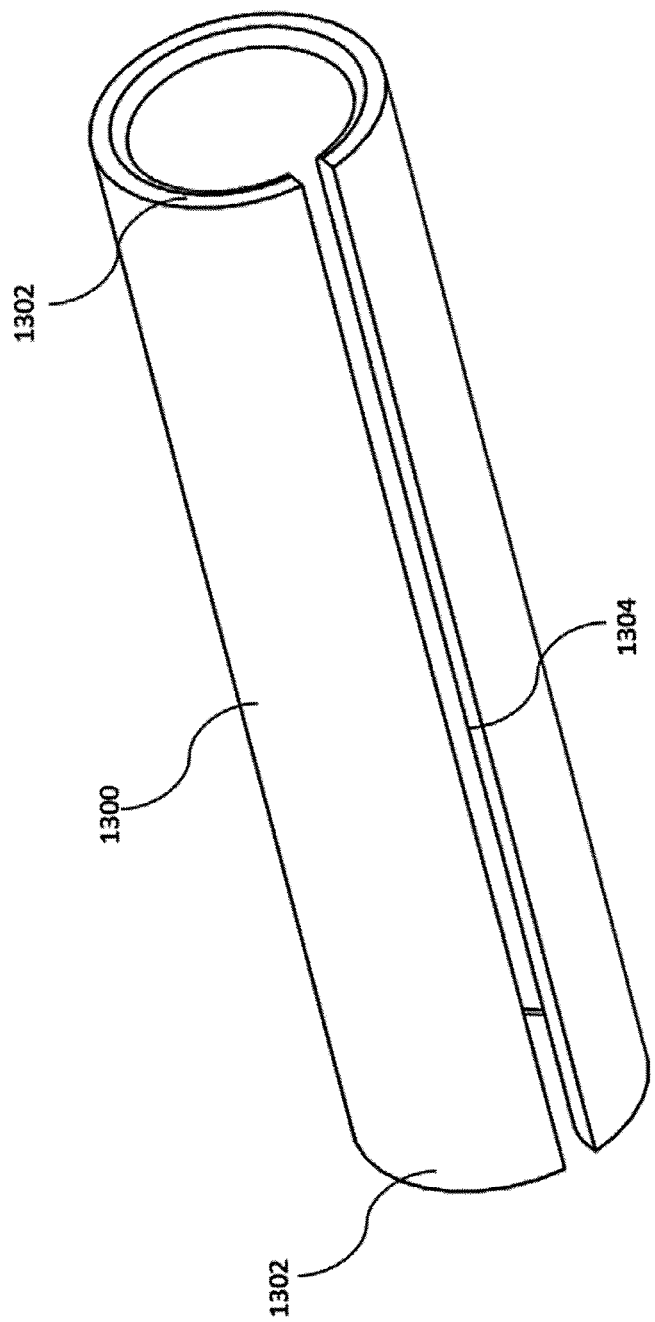
FIG. 13 is a perspective view of an alignment sleeve according to one example.
Figure 15:
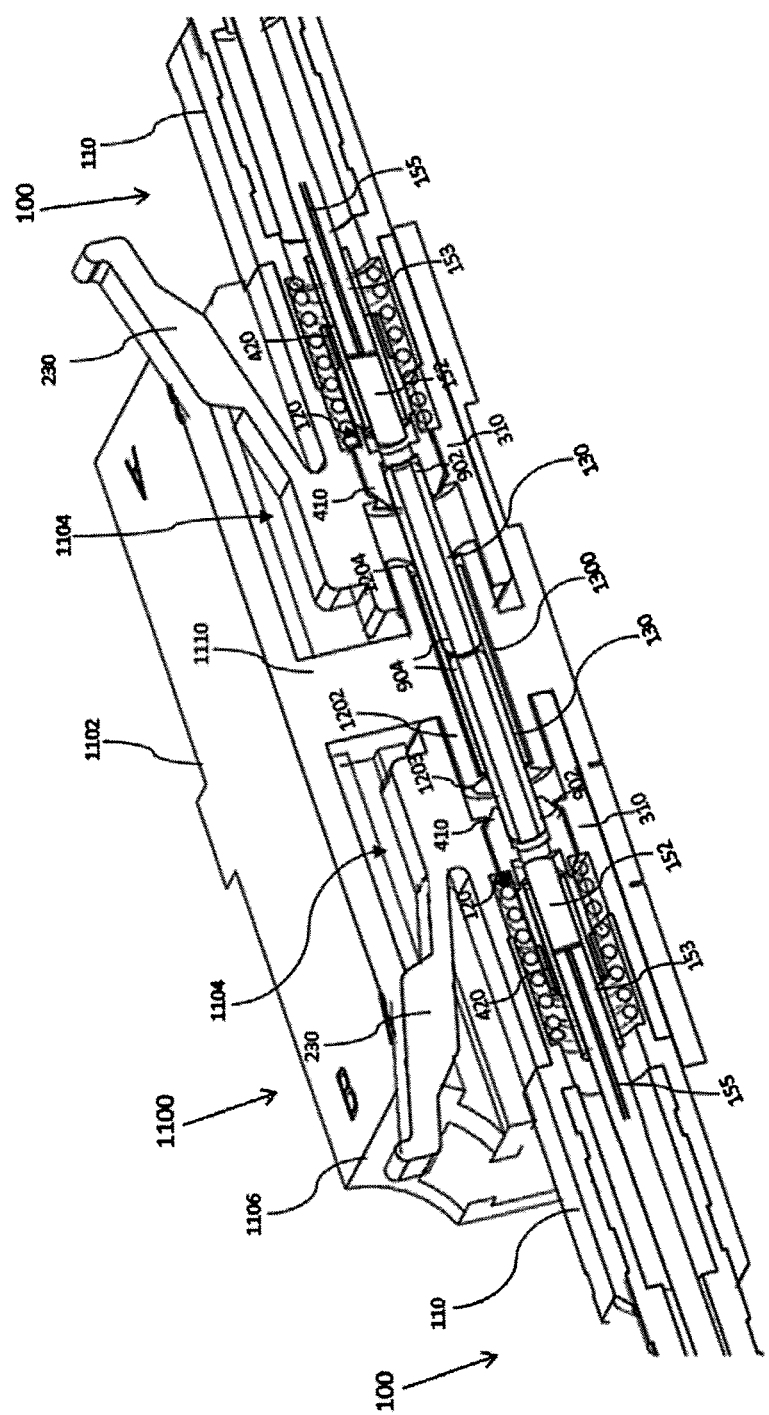
FIG. 15 is a cross-sectional view of the optical connector adaptor coupled to two connectors according to one example.

Referring to FIGS. 13 and 15, an alignment sleeve 1300 is disposed in the sleeve holder 1202 such that the alignment sleeve 1300 is coaxially aligned with the tube holder 1202. In the illustrated embodiment shown in FIG. 13, the alignment sleeve 1300 is tubular-shaped and includes a pair of open ends 1302 and a slot 1304 that extends along the length of the sleeve 1400. In some embodiments, the alignment sleeve 1300 is comprised of a ceramic or a resilient metal material.

As shown in FIG. 15, the alignment sleeve 1300 is configured to receive the second end 904 of a respective alignment tube 130 when the connector 100 is inserted into the port 1104. When the second end 904 of the respective alignment tube 130 is inserted into the open end 1302 of the alignment sleeve 1300, the alignment sleeve 1300 expands and retracts radially to grasp the alignment tube 130, thereby providing an interference fit between the alignment sleeve 1300 and the alignment tube 130.

Figure 14:
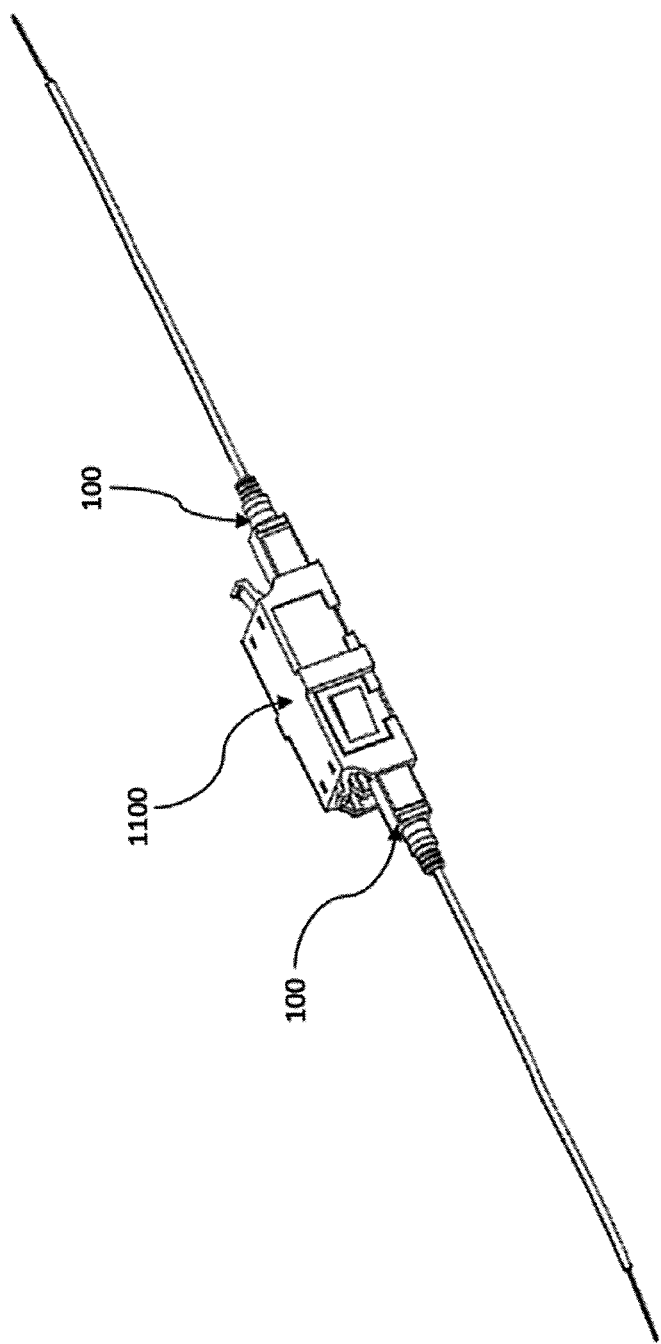
FIG. 14 is a perspective view of the optical connector adaptor coupled to connectors according to one example.

Referring to FIGS. 14 and 15, two connectors 100 are mated in the optical connector adaptor 1100 such each one of the opposing ports 1104 receives a respective connector 100. As the connector 100 is received in the port 1104, the second end 904 of the alignment tube 130 is inserted through one of the open ends 1302 of the alignment sleeve 1300 and is disposed proximate to the second end 904 of the alignment tube 130 of the counterpart connector 100. Once each connector 100 is coupled to its associated port 1104 of the optical connector adapter 1100, the centerline axes of the alignment tubes 130 held in the alignment sleeve 1300 become substantially aligned, thereby establishing an optical path between the collimating lens 152 of the mated connectors 100. Accordingly, each connector 100 may transmit light beams to or from the counterpart connector 100 via the optical path defined along the alignment sleeves 130 held in the alignment sleeve 1300.

According to the various embodiments described above, the EB LC connector may implemented with a fiber optic LC connector interface. All dimensions described above may be adjusted or altered accordingly for a fiber optic LC connector interface.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. An expanded beam (EB) optical connector comprising:
   a body comprising a first end, a second end, and a bore extending from the first end to the second end;
   a tube holder received within the bore of the body, the tube holder comprising a first end, a second end, a first cavity opening from the first end of the tube holder, a second cavity opening from the second end of the tube holder, and an annular-shaped partition separating the first cavity from the second cavity and surrounding a passage opening into the first and second cavities;
   an alignment tube received within the bore of the body, the alignment tube comprising a first end and a second end and defining a centerline axis that extends from the first end to the second end; and
   a collimator assembly received within the bore of the body, the collimator assembly comprising an optical fiber and a collimating lens for creating a substantially collimated optical beam, wherein
   the first end of the alignment tube is received within the first cavity of the tube holder, and the collimating lens is received within the second cavity of the tube holder such that the collimating lens is separated from the first end of the alignment tube by a gap and the centerline axis of the alignment tube is substantially aligned with an optical axis of the collimated optical beam,
   the alignment tube defines a bore that extends from the first end the alignment tube to the second end of the alignment tube such that the tube is open at both of its ends, and
   nothing but air is located within the bore of the alignment tube.

2. The EB optical connector of claim 1, wherein the gap is defined by at least the passage extending along the partition.

3. The EB optical connector of claim 1, wherein the collimating lens is disposed between a terminating end of the optical fiber and the first end of the alignment tube.

4. The EB optical connector of claim 1, wherein the body comprises a neck projecting away from an interior surface of the body such that the bore of the body includes a first region extending from a front end of the neck to the first end of the body, a second region extending between the front end and a back end of the neck, and a third region extending from a back end of the neck to the second end of the body.

5. The EB optical connector of claim 4, wherein the alignment tube extends along the first region of the bore of the body and out of a first opening disposed at the first end of the body.

6. The EB optical connector of claim 4, wherein the optical fiber extends along the third region of the bore of the body and out of a second opening disposed at the second end of the body.

7. The EB optical connector of claim 4, wherein the tube holder comprises a head disposed proximate to the first end of the tube holder and a sleeve extending from the head to the second end of the tube holder.

8. The EB optical connector of claim 7, wherein the head of the tube holder is disposed in the second region of the bore of the body such that the head is held by the neck.

9. The EB optical connector of claim 7, wherein the head comprises a flange projecting radially from the sleeve and a conical-shaped nose projecting from the flange in a direction opposite to the sleeve, the nose terminating at the first end of the tube holder.

10. The EB optical connector of claim 7, wherein the first cavity is disposed in the head of the tube holder, and the second cavity is disposed in the sleeve of the tube holder.

11. The EB optical connector of claim 1, wherein the body comprises a latch projecting from a top wall extending from the first end to the second end of the body, and the latch includes a distal end biased in a direction away from the top wall of the body.

12. An optical connector adaptor comprising:
    a housing;
    two or more ports including a first port opening from a first end of the housing and a second port opening from a second end of the housing and opposing the first port; and
    an alignment sleeve comprising a first open end and a second open end, the alignment sleeve is disposed between the first and second ports such that the first open end of the alignment sleeve is disposed in the first port and the second open end of the alignment sleeve is disposed in the second port;
    wherein each port is configured to receive an EB optical connector of claim 1 such that the EB optical connector is removably coupled to the housing when received in a respective port;
    wherein the first open end of the alignment sleeve is configured to receive the second send of the alignment tube of a first EB optical connector when received in the first port, and the second open end of the alignment sleeve is configured to receive the second end of the alignment tube of a second EB optical connector when received in the second port such that alignment sleeve substantially aligns the centerline axes of the alignment tubes of the first and second EB optical connectors when received in the first and second ports.

13. An expanded beam (EB) optical connector comprising:
    a body comprising a first end, a second end, and a bore extending from the first end to the second end;
    a tube holder received within the bore of the body, the tube holder comprising a first end, a second end, a first cavity opening from the first end of the tube holder, a second cavity opening from the second end of the tube holder, and an annular-shaped partition separating the first cavity from the second cavity and surrounding a passage opening into the first and second cavities;
    a hollow cylinder for aligning the EB optical connector with a second EB optical connector, the hollow cylinder being received within the bore of the body, and the hollow cylinder comprising a first end and a second end and defining a centerline axis that extends from the first end to the second end; and a collimator assembly received within the bore of the body, the collimator assembly comprising an optical fiber and a collimating lens, wherein the first end of the hollow cylinder is received within the first cavity of the tube holder, and the collimating lens is received within the second cavity of the tube holder such that the collimating lens is separated from the first end of the hollow cylinder by a gap and the centerline axis of the hollow cylinder is substantially aligned with an optical axis of the collimating lens, and the hollow cylinder defines a bore that extends from the first end the hollow cylinder to the second end of the hollow cylinder such that the hollow cylinder is open at both of its ends, and nothing but air is located within the hollow cylinder.

* * * * *